May 3, 1927.
J. B. WHITMORE ET AL
1,626,652
HOOK FORMING MACHINE
Filed July 12, 1921   2 Sheets-Sheet 1
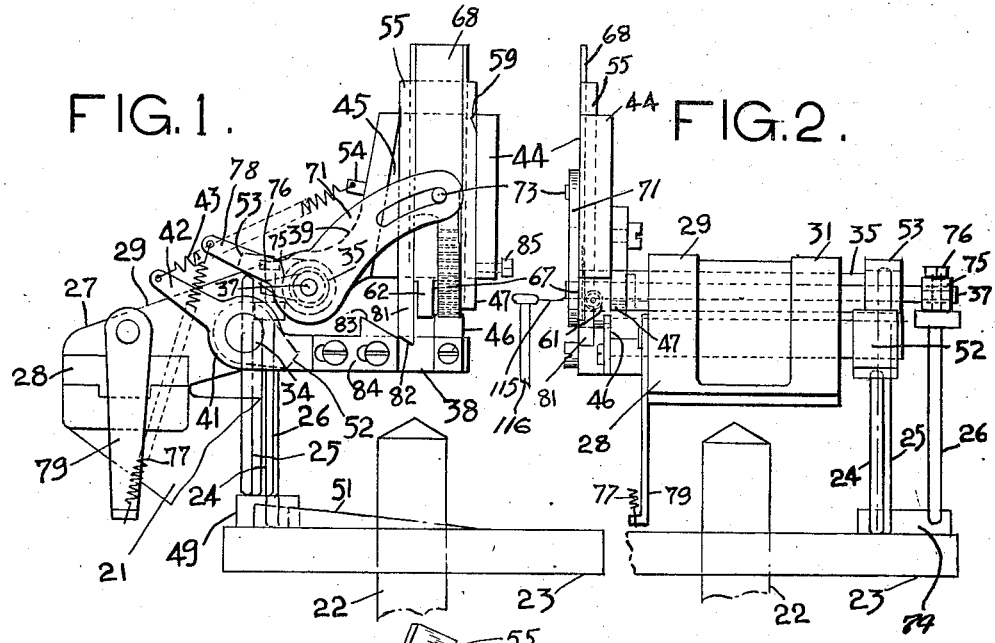
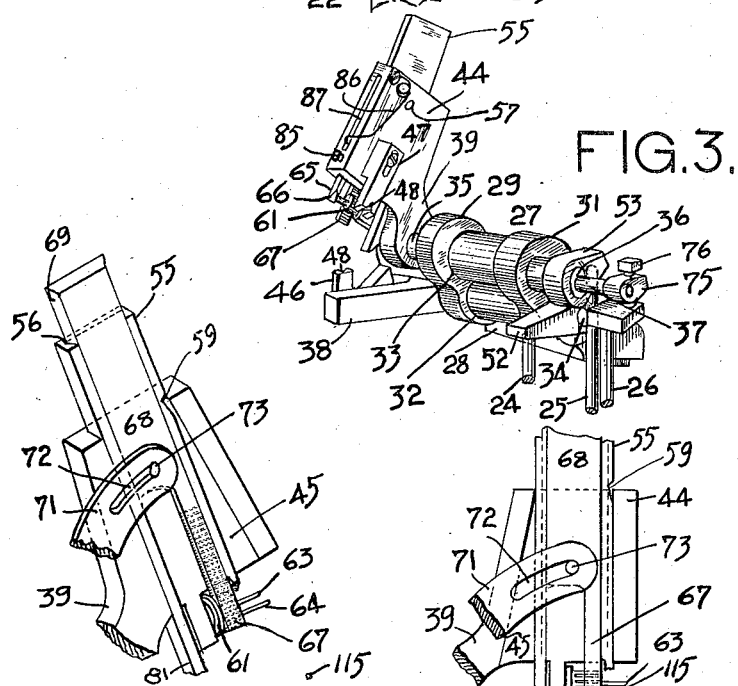
INVENTOR
JAMES B. WHITMORE
JOHN E. FERGUSON
BY
ATTORNEY May 3, 1927.  J. B. WHITMORE ET AL  1,626,652
HOOK FORMING MACHINE
Filed July 12, 1921    2 Sheets-Sheet 2

INVENTOR
JAMES B. WHITMORE.
JOHN E. FERGUSON.
BY
ATTORNEY

Patented May 3, 1927.

1,626,652

UNITED STATES PATENT OFFICE.

JAMES BRYANT WHITMORE AND JOHN EBLING FERGUSON, OF BLOOMFIELD, NEW JERSEY, ASSIGNORS TO WESTINGHOUSE LAMP COMPANY, A CORPORATION OF PENNSYLVANIA.

HOOK-FORMING MACHINE.

Application filed July 12, 1921. Serial No. 484,086.

This invention relates to the art of manufacturing incandescent electric lamps, and it has special relation to a device for automatically forming hooks of different designs in the support wires for the filaments in such lamps.

An object of the invention is to provide an adjustable device for forming hooks of different designs.

Another object is to provide a device for forming either open or closed hooks in support wires and which may be used as an attachment in certain standardized inserting and hook-forming mechanism.

A still further object is to provide a simplified and compact arrangement of parts which are adaptable for convenient alteration to form hooks of the pigtail or open variety in different planes and with the opening therein arranged upwardly or downwardly.

Other objects will be apparent from the following detailed description.

In the manufacture of incandescent electric lamps, the ends of the support wires or anchors are bent or formed into a variety of different shapes to form what are commonly termed hooks. The configuration imparted to the hook is more or less dependent on the particular type of lamp being manufactured. For instance, in the manufacture of Madza B lamps wherein ordinarily a straight filament is employed, the hooks are usually open whereas, in the ring-type construction, or Mazda C lamps, in which a coiled filament principally is used, hooks of different construction, usually pigtail or closed hooks are found more desirable.

Automatic mechanisms have been devised for forming hooks of each of the kinds just mentioned, but, so far as we are informed, no self-contained device has been constructed which may be adjusted or, by a simple alteration or substitution of parts, be converted to form either an open or a closed hook and with the opening therein upward or downward and also to form such hooks in different planes. It is the purpose of this invention to provide such a device and one which may be used either as an attachment for machines of certain types at present in use for inserting and forming open hooks or as an individual unit useful for that purpose alone.

A well recognized machine of the kind in which the attachment may be found useful consists of an intermittently rotating carrier supporting a plurality of work-supporting heads. These heads are indexed at a number of stations where various operations are performed. At one of these stations, a reciprocating head picks up the wire and unwinds it from a spool, carries it forwardly and inserts the end into the work. The head releases the wire and then retreats and, shortly thereafter, cutting jaws engage the inserted wire at a predetermined distance outwardly from the work to sever the wire. Immediately thereafter, dies engage the end of the wire and form it into an open hook. The cutting jaws in this machine are conveniently attached to a pair of oscillating shafts, the latter being mounted in a casting removably carried by a shelf or bracket secured to the framework of the machine. These shafts are actuated by cams mounted on the face of a disk which, in turn, is secured to the upper end of a vertically disposed shaft.

The present invention utilizes the shelf and actuating cams at present employed, so that, by simply removing the casting and the cutting and forming mechanism secured thereto, an attachment incorporating the features of this invention may be substituted and the existing machine thus converted into a device which will form a variety of differently shaped hooks.

The advantages thus gained are obvious and, therefore, need no elucidation.

An embodiment of the invention is illustrated in the accompanying drawings, in which—

Fig. 1 is a front elevation of a device for forming a vertical pigtail hook with the opening downward;

Fig. 2 is an end elevation of the device illustrated in Fig. 1;

Fig. 3 is a rear view, in perspective, of the device illustrated in Fig. 1 and showing more clearly, in detail, the cutting jaws and the casting and the actuating means for the shafts mounted therein;

Fig. 4 is a front view, in perspective, of a portion of the upper jaw and of the forming means mounted therein, indicating the relative positions of the different parts thereof prior to the engagement of the forming pins with the wire;

Fig. 5 is a view similar to Fig. 4 but illustrating the positions of the different parts after engagement with the wire has been effected;

Figure 6:
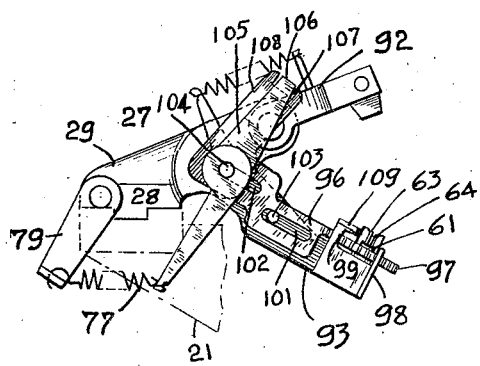
Figs. 6 and 7 are front and end elevations, respectively, of the device illustrated in Figs. 1 to 5, modified to form a pigtail hook in a horizontal plane.
Figures 16, 17:
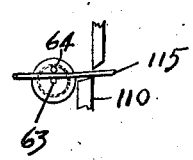

The present machine may comprise an integral casting which carries a pair of cutting jaws or members adapted to be actuated toward and from each other. Each of the jaws carries a cutter which cooperates, upon movement of the jaws together, to effect a severance of the inserted wire, positioned between them. While the cutters are being moved into engagement with the wire, a mechanism comprising a mandrel and a revolving pin is shifted into engagement with the wire so that the mandrel is either below or above the wire, with the revolving member on the opposite side. Immediately upon severance of the wire, the revolving pin is actuated to bend the severed end of the wire about the mandrel to form the hook. If the revolving member rotates in a clockwise direction (Fig. 9) the opening in the hook is upward, and, when the direction of rotation is reversed, obviously, the opening in the hook will be positioned downwardly. When the extent of oscillation of the revolving pin is adjusted and a knife having a broader face is employed, a hook such as is depicted in Fig. 17 will be formed. If a closed or an open hook is desired in a horizontal plane, the mandrel and the revolving pin are disposed as shown in Fig. 6. Regardless of the position or the adjustment of the mechanism, after the hook has been formed, the forming means are withdrawn therefrom upon a movement of the cutting jaws away from each other.

Hereinafter, wherever the word hook or hooks may be used, it is to be understood that any design into which a wire may be twisted which will serve the purpose of supporting a filament in an electric incandescent lamp is to be included.

Referring now to Sheet 1 of the drawings, 21 indicates a bracket or shelf, 22 a vertical shaft, 23 a cam disk secured thereto, and 24, 25 and 26 indicate a series of pusher rods actuated by a plurality of cams on the face of the cam disk. This structure constitutes part of a machine for forming open type hooks and to which the device about to be described may be readily attached by merely removing the present structure secured to the bracket 21 and substituting the improved mechanism therefor.

It is understood, of course, that the device herein described, is not restricted in its use merely as an attachment for existing machines but that it possesses broader possibilities, since it is a self-contained unit and, for that reason, may be used for forming hooks independently of any other existing structures.

The device into which this invention has been embodied comprises an integral casting or frame 27 having a bed plate 28 from which two supporting arms 29 and 31 extend in an outward direction. Each of the arms has a pair of bearing openings 32 and 33 therethrough, the openings in one arm being in axial alignment with corresponding openings in the other arm. Rotatably mounted within the bearing openings are two parallel shafts 34 and 35, the latter having a longitudinal bore 36 within which a rotatable shaft 37 is housed. The cutting jaws or members and the mechanism which forms the hooks may be secured to the shafts 34, 35 and 37.

In the embodiment selected for illustrative purposes only, the cutting jaws may consist of two arms 38 and 39, extending in the same general directions as the shaft-supporting arms 29 and 31. The arm 38 may have a rectangular cross-section, as illustrated more clearly in Fig. 3, with an enlarged circular end portion or hub 41 having an outwardly extending arm 42 to which a spring 43 may be connected at one end to retain the jaw in its normal position. The hub 41 is bored to fit over the shaft 34 to which it may be secured in rigid relationship in any well known manner.

The other arm 39 of the cutting members is rigidly secured, at one end, to the shaft 35, and, at its other end, may have, as an integral part thereof, a substantially rectangular housing 44 having a trapezoidal shaped slot 45 in its face, the narrowest dimension of the slot being uppermost. The arm 39 is directly above and a little to one side of the arm 38 for a purpose to be later set forth.

Cutting blades or knives 46 and 47 are removably and adjustably secured adjacent the outer ends of the arms 38 and 39, respectively, and, due to the offset relationship of these arms, the cutting blades, when brought together upon actuation of the arms toward each other, operate upon the material positioned between them with a shear cut. In order to make a clean cut, the blades may be beveled to provide a sharper edge. Each of the blades may be provided with a slot 48 in its cutting edge so as to more accurately position the wires with respect to the cutting edges and to prevent movement of the wire upon engagement by the forming mechanism later to be described. The object in making the cutting blades adjustable is to permit a sharper cut to be made as well as to accommodate the device for operation on different thicknesses of material. By mounting the blades so that they may be readily removed, other blades may be substituted having keener edges or having a different design.

The cutters are positively moved into engagement with the wire, from which a support or anchor is to be later formed, by cams 49 and 51 constituting parts of the face of the cam disk 23. The cam 49 engages the lower end of the push rod 24 which later, upon movement upwardly, engages a crank 52 rigidly fastened to the shaft 34. The crank 52 is on the same side of the shaft as the jaw 38 so that, upon movement of the crank upwardly, a corresponding oscillation will be imparted to the jaw 38. The cam 51 actuates the pusher rod 25 which, in turn, engages a crank 53 keyed or otherwise secured to the shaft 35. The crank 53 extends outwardly from the side opposite to that upon which the jaw 39 is mounted so that, upon actuation of the crank upwardly, the jaw 39 will be lowered. Thus, it will be seen that the jaws 38 and 39 are moved toward each other by positively actuated means to effect a severance of the wire. The jaws are returned to normal position by the spring 43, heretofore described as having an end secured to an extension 42 of the jaw 38. The other end of the spring is fastened to a lug 54 integral with the housing 44.

The mechanism for forming the wire into nodular or hook shape may be carried in part or entirely by one of the cutting jaws. In the structure illustrated, such mechanism preferably consists of a rectangular plate 55 having a dovetailed slot 56 extending throughout its length. This plate may be pivotally mounted on a stud 57 in the trapezoidal slot 45 heretofore described as being in the face of the housing 44. In order that there may be no binding between the upper end of the plate and the walls of the slot during its rocking movement, the upper end of the plate may be notched at 59.

The device which operates upon the wire to alter its form into differently designed hooks may be secured to the lower end of the plate 55 in order to obtain compactness of parts and efficiency of operation. Such device preferably consists of a pinion 61 mounted for rotation on a stud 62 projecting downwardly from the lower end of the plate 55. Projecting outwardly from the face of the pinion are two pins 63 and 64 between which the wire is positioned at the time it is formed into a hook. The pin or mandrel 63 is centrally positioned with respect to the pinion and may be rigid therewith or else the pinion may be mounted to rotate thereabout. The forming means or pin 64 may be secured to the pinion adjacent its periphery so that, when the pinion is rotated, the pin 64 will bend or loop the wire about the mandrel 63 by a rolling action or a series of angular movements.

In order to direct the end of the wire while a hook is being formed so that it will overlap the shank of the wires on the same side each time, a guide may be provided. This guide member may consist of a stud 65 projecting downwardly from the lower end of the plate 55 and arranged adjacent the ends of the forming pins 63 and 64. The lower end of the stud has an inclined face 66 of such design that the desired movement of the end of the wire may be had. The position which the stud occupies with respect to the wire may be altered by simply shifting the stud, and any suitable form of adjustment may be devised for accomplishing that end. By reason of such an adjustment, the opening formed at the point where the end of the wire crosses the shank when a pigtail hook is being formed may be regulated. Obviously the same effect in diverting the end of the wire to the one or the other side may be secured by having a similar cam surface operate on any other portion of that part of the wire which forms the loop, and it is considered unessential to illustrate such modification since it can readily be made by a mechanic skilled in the art.

The pinion 61 may be actuated by any suitable connection to the shaft 37. It has been found preferable to employ a reciprocating rack 67. This rack is secured to a plate 68 having dovetailed edges 69 adapted to fit and slide within the dovetail slot 56. A desired means for reciprocating the rack is provided by deriving power from arm 71 which has a slot 72 in its outer end and through which a pin 73 secured to the plate 68 projects. The arm is secured to the shaft 37 which latter may be oscillated by means of a cam 74 on the face of the cam disk 23 through the instrumentality of the pusher rod 26 and a crank 75, the latter being fixed to the shaft 37 and extending in a direction therefrom opposite to that of the arm 71. The extent the shaft and, subsequently, the pinion 61 may be oscillated may be conveniently regulated by adjustment of a screw 76 in the end of the crank 75. A spring 77 may be employed to return the rack and parts connected therewith to normal position. This spring is connected at one of its ends to an extension 78 rigid with the arm 71 and extending in a direction opposite thereto and its other end to an arm 79 fixed to the casting 27.

Before the wire can be formed into any desired configuration it is essential that the forming means be brought into engagement with the wire, and, in order to effect such an operation, the plate 55 and the mechanism carried thereby, which includes the hook-forming mechanism, is swung or rocked about its pivot point. A convenient manner for accomplishing this movement is through an arm 81 projecting downwardly from the lower end of the plate 55. An inclined face 82 on the lower end of the arm 81 is adapted to engage the inclined face 83 of an adjustable cam 84 upon actuation of the jaws 38 and 39 together, and the pitch and length of the face 83 is such as to shift or swing the forming members toward the wire and into engagement therewith substantially at the time the cutters engage the wire so that further movement of the jaws together to sever the wire may be had. The extent of the forward movement of the forming members may be regulated by an adjustable stop screw 85, and their return to normal position may be accomplished by a spring 86 secured, at one end, to the housing 44 and having its opposite end projecting through a slot 87 in an edge of the housing and against an edge of the plate 55.

The foregoing description has been primarily confined to the structure illustrated on Sheet 1 of the drawings, which arrangement is adapted to form a vertical pigtail hook, with the opening therein directed downwardly. However, the same general arrangement of parts is used to form a vertical pigtail hook, with the opening therein directed upwardly, the only change necessary being the substitution of a rack which will engage the pinion on the inner side or the side opposite to that shown in Fig. 4.

Figure 18:
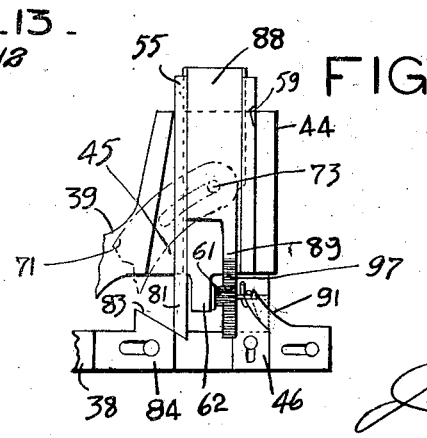
Fig. 18 is a front elevation corresponding somewhat to Fig. 1 but with the mechanism modified to form a pigtail hook in a vertical plane, with the opening upward.

In Fig. 18 is illustrated the arrangement of parts when it is desired to form a vertical pigtail hook, with the opening upward. The parts 38, 39, etc. correspond, in all particulars, to similar parts in the form of device illustrated on Sheet 1 of the drawings, the only parts distinguishable therefrom being the rack and the guide to which different reference characters have been assigned for the purpose of clearness. The rack comprises a plate 88 substantially like the plate 68 and is adapted to snugly engage the dovetail slot 56 of the plate 55. The rack portion 89 which is adapted to engage the pinion does not lie in the same plane as the outer face of the plate 88 but lies in the plane of the opposite face so that engagement with the pinion may be had on the opposite side.

In the form of device used to form a vertical pigtail hook with the opening upward, it is preferable to mount the guide on the lower jaw. In Fig. 18, the guide 91 is shown as adjustably secured to the lower jaw 38. The face of the guide is so designed as to divert the end of the wire, during its formation into a hook or loop, to the desired side of the wire, and, by simply shifting the guide by means of its adjustable connection with the jaw 38, the extent to which the end is diverted may be readily controlled and the opening in the pigtail increased or diminished at will.

It will thus be seen that only a very slight alteration of the mechanism illustrated on Sheet 1 of the drawings is necessary in order to convert the device so that a pigtail hook, with the opening upward, may be formed.

Figure 7:
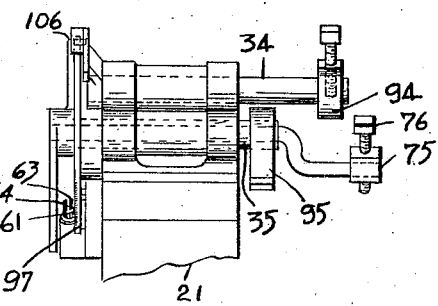

In case it is found desirable to form a pigtail or open hook in a plane other than a vertical plane, an arrangement of the parts such as illustrated in Figs. 6 and 7 may be used. The device therein illustrated embodies all the fundamental characteristics of the mechanism for forming vertical hooks, the differences residing only in the transfer of the forming mechanism from the upper jaw to the lower jaw, which necessarily requires a slightly altered construction of actuating mechanism.

In order to convert the mechanism illustrated in Figs. 1 to 5 and 18 into a horizontal-pigtail or open-hook-forming device, the cutting jaws 38 and 39, the shaft 37 and the crank 52 are removed entirely from the machine. The shaft 35 is shifted to the lower pair of bearing openings and the shaft 34 to the upper set of openings. The subsequently described mechanism is then secured to these elements.

Cutting jaws 92 and 93 are rigidly secured to the shafts 34 and 35, respectively. Cutters similar to those previously described are secured in these jaws so that, upon movement of the jaws together, a wire positioned between them will be severed by a shear cut. The jaws may be conveniently oscillated through actuation of the cranks 94 and 95 by any desired instrumentality.

The forming means, including the pinion 61 and the pins 63 and 64 are employed in forming a vertical pigtail hook, may be mounted adjacent the outer end of the lower jaw 93. A convenient means for actuating the pinion may consist of a slidable rack bar 96 having the rack portion 97 thereof maintained in engagement with the pinion by means of a pair of guides 98 and 99 secured to the end of jaw 93. Slots 101 and 102, the former engaging a stud 103 projecting from the jaw and the latter a shaft 104 passing through the bore of the shaft 35, assist in confining the reciprocation of the rack to a substantially straight line. Slidable motion may be imparted to the rack bar 96 from the shaft 104 by means of a crank arm 105 rigidly affixed thereto and having a hook 106 on its outer extremity to engage a notch 107 in the outer end of a right angular extension 108 of the rack bar. The outer ends of the shaft 104 has an elbow in it so as to position its ends adjacent the push rod 26 when the device is attached to standard mechanism. The crank 75, having the screw 76 adjustably threaded therein, may be attached to the end of the shaft. The push rod is adapted to engage the end of the screw and thus, by suitably adjusting the screw, the extent of oscillation imparted to the forming pins may be regulated.

Figures 14, 15:
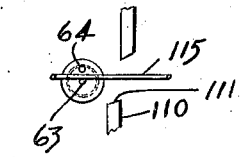
Figs. 14 to 17 illustrate, by series of end elevations, the formation of an open hook.

The foregoing description has been principally confined to a mechanism which, by a comparatively simple change, may be readily converted into a device for forming an open hook. Such adjustment or alteration may be accomplished by substituting a knife 110 (Fig. 14) having an edge or abutment portion 111 which serves to prevent the end of the wire from swinging around the mandrel 63 upon rotation or oscillation of the forming pin 64. In forming an open hook or loop, it is unnecessary to rotate the forming pin 64 to as great an extent as when a closed or pigtail hook is being formed, and, in order to regulate or adjust the movement of this member, the adjusting screw 76 heretofore described has been provided. Obviously, when the opening in the hook is directed downwardly, the upper knife is the one which is removed and a knife having an abutment such as previously described is substituted therefor.

The general operation of the machine may be best explained by reference to Fig. 3 and to Figs. 8 to 13 which latter figures show, diagrammatically, the various positions of the mandrel and forming pin during their progress in forming a pigtail hook. With the jaws in the open position illustrated in Fig. 3 and a wire 115 located therebetween, the shafts 34 and 35 are oscillated in opposite directions, to bring the cutting blades carried by the jaws 38 and 39 into engagement with the wire to sever it by a shear cut preferably after insertion in the arbor 116 (Fig. 2). The forming pins are in their retracted position (Fig. 4) at the beginning of such movement but, as the jaws approach each other, the arm 81 engages the cam 84, resulting in the advancement of the pins toward the wire (Fig. 5). Approximately at the time the cutters sever the wire, the forming pins engage the wire and, immediately thereafter or substantially therewith, the shaft 37 or 104 is oscillated to actuate the pinion and the forming pin 64 secured thereto. While the end of the wire is being swung or wrapped around the mandrel 63, it engages the curved surface of the guide 65, 91 or 109 which diverts it to one side, as shown at 113 in Fig. 12. After the formation of the hook, the forming means are disengaged therefrom upon movement of the jaws away from each other.

Figures 8, 9:
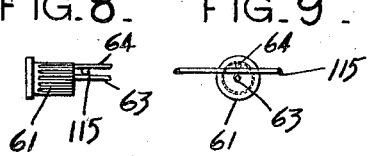
Figs. 8 to 13 illustrate, by side and end elevations, the successive stages in the formation of a pigtail hook.
Figures 10, 11:
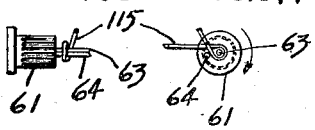
Figures 12, 13:
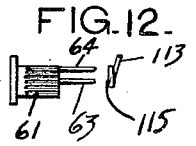

In Figs. 8 and 9, the forming pins are shown in engagement with the wire prior to rotation thereof while, in Figs. 10 and 11, the forming pin has completed its movement, the pigtail hook having been fully formed. In Fig. 12, the forming pins are shown removed from the formed pigtail hook and in Fig. 13, the finished hook is shown, the opening 112 being directed upwardly.

When it is desired to make the opening in the pigtail downward, that is, the reverse of that shown in Fig. 13, the forming pin 64 is revolved in a direction contrary to that indicated in Fig. 11.

In the event it is found necessary or desirable to convert the machine so that it may be adapted to form an open hook such as illustrated in Fig. 17, the adjustment heretofore set forth is first made. In the formation of such a hook, the forming pin is rotated or oscillated to the extent indicated in Fig. 16. The relative position of the knife and the forming pin during the process of formation of an open hook will be more clearly seen from Figs. 14 to 16.

The structural details of the machine may be variously modified without departing from the spirit and scope of the invention; and it is therefore to be understood that the invention is not to be restricted to the precise embodiments herein shown and described, but that it comprehends all such modifications as fall within the scope of the appended claims.

What is claimed is:

1. A device for forming an end of a wire into hook shape, comprising a mandrel, means cooperating with said mandrel to bend a wire about the same, an oscillatory carrier for said mandrel and said cooperating means, and means for actuating said carrier to move said mandrel and said cooperating means to position in operative relation to a wire.

2. A device for forming an end of a wire into hook shape, comprising means for cutting a wire, a mandrel, means cooperating with the mandrel to engage and bend the end of the wire, an oscillatory carrier, means upon said carrier for effecting a relative movement between said cooperating means and said mandrel, and means for moving the carrier to bring the mandrel and cooperating means in operative relation to an end of said wire.

3. A device for forming a hook at the end of a wire, comprising a fixed member, a movable member for bending a wire about said fixed member, a common carrier for said members, and means for moving said carrier through an arcuate path to position a wire for bending by said members.

4. A device for forming a wire into a hook, comprising a swinging member, a mandrel and a forming means carried thereby, means for operating said swinging member to juxtapose said wire between said mandrel and said forming means, and means for actuating said forming means to engage said wire and loop the same about said mandrel.

5. In a support-wire inserting and hook-forming machine, an attachment therefor comprising a movable frame, a pair of oscillatory members carried upon said frame, a cutting jaw mounted upon each of said members and movable therewith to sever a wire, and means associated with one of said members for engaging and forming the end of a severed wire into a hook.

6. In a support-wire inserting and forming machine, an attachment therefor comprising a removable frame, a pair of parallel shafts carried thereby, means for oscillating said shafts, and means connected to said shafts adapted, upon oscillation of said shafts, to cut and form said wire after insertion into a pigtail hook.

7. An attachment for a support-wire inserting and forming machine comprising a frame, a pair of shafts carried thereby, means for oscillating said shafts, means connected with said shafts and adapted, upon oscillation thereof, to move toward and from each other, means carried by said second-named means for engaging a wire to sever the same, and additional means carried by one of said second-mentioned means, upon movement thereof toward said wire, to engage the same and form it into a hook.

8. An attachment for a support-wire inserting and forming machine, comprising a frame, a pair of shafts rotatably carried thereby, a pair of oscillatory members connected to said shafts, means for operating said shafts to move said members toward and from each other, and means carried by one of said members for engaging said wire and forming the same into a hook.

9. An attachment for a support-wire inserting and forming machine, comprising a pair of pivotally mounted jaws, means for actuating said jaws toward and from each other, and means carried by one of said jaws for engaging the wire at substantially the termination of its movement toward said wire for forming the wire into a hook.

10. In a wire-forming device, means for supporting a length of wire, a pair of pivotally mounted jaws, means for actuating said jaws to and from each other, means carried by one of said jaws for engaging the wire at substantially the termination of its movement toward said wire for forming the wire into a hook, said last-mentioned means being capable of adjustment to vary the degree of opening of said hook.

11. In a wire-forming device, means for supporting a length of wire, a pair of pivotally mounted jaws, means for actuating said jaws toward and from each other, means carried by one of said jaws for engaging a wire to form a hook of a predetermined opening, said last-mentioned means being capable of adjustment to vary its degree of movement, whereby a hook of a different width opening may be formed.

12. In a wire-forming device, a pair of pivoted members, means for actuating said members toward and from each other, means carried upon one of said members for forming a hook in a wire substantially at the termination of the movement of said last-mentioned member toward the other member, and means whereby the second-named means may be adjusted to vary the degree of opening of said hook.

13. In a wire-forming device, a pair of pivoted members, means for actuating the same toward and from each other, means carried by one of said members for forming a hook in said wire in one direction, said last-named means being readily removable in part to permit substitution of mechanism adapted to form a hook in the opposite direction.

14. In a support-wire forming machine having a rotatable work support and a shelf carrying a forming mechanism, an attachment adapted to be secured to said shelf upon removal of said forming mechanism, said attachment comprising a casting, a pair of parallel shafts rotatably supported therein, a pair of jaws secured to said shafts, and means carried by one of said jaws for engaging the wire to form a pigtail hook therein.

15. In a support-wire forming machine having a rotatable work support and a bracket carrying wire-forming mechanism, an attachment adapted to be secured to said bracket upon removal of said forming mechanism, said attachment comprising a casting, a pair of parallel shafts rotatably supported therein, a pair of jaws secured to said shafts, and means movable with one of said jaws for engaging a wire to form a pigtail hook therein, said last-mentioned means being capable of association with other mechanism to vary the character of said hook.

16. In a support-wire forming machine having a rotatable work support and a shelf carrying wire-forming mechanism, an attachment adapted to be secured to said shelf upon removal of said forming mechanism, said attachment comprising a casting, a pair of parallel shafts rotatably supported therein, a pair of jaws secured to said shafts, and means movable with one of said jaws for engaging the wire to form a pigtail hook therein, said last-mentioned means being adapted for association with other mechanism to vary the direction in which said pigtail hook is formed.

17. In a support-wire forming machine having a rotatable work support and a shelf carrying wire-forming mechanism, an attachment comprising a casting, a pair of parallel shafts rotatably supported therein, a pair of jaws secured to said shafts, and means movable with one of said jaws for engaging a wire to form a pigtail hook therein, said last-mentioned means being adapted for association with other mechanism to vary the direction in which the pigtail hook is formed and to vary the character of said hook.

18. In a support-wire forming machine having a rotatable work support and a shelf carrying the forming mechanism, an attachment adapted to be secured to said shelf upon removal of said forming mechanism, said attachment comprising a casting, a pair of parallel shafts rotatably supported therein, a pair of jaws secured to said shafts, and means carried by one of said jaws for engaging the wire to form a pigtail hook therein including a fixed member and a member operating thereabout.

19. In a support-wire forming machine having a rotatable work support and a shelf carrying the forming mechanism, an attachment adapted to be secured to said shelf upon removal of said forming mechanism, said attachment comprising a casting, a pair of parallel shafts rotatably supported therein, a pair of jaws secured to said shafts, and means carried by one of said jaws for engaging the wire to form a pigtail hook therein including a mandrel and a pin adapted to oscillate thereabout.

20. In a support-wire forming machine having a rotatable work support and a shelf carrying the forming mechanism, an attachment adapted to be secured to said shelf upon removal of said forming mechanism, said attachment comprising a casting, a pair of parallel shafts rotatably supported therein, a pair of jaws secured to said shafts, and means carried by one of said jaws for engaging the wire to form a pigtail hook therein, said last-mentioned means comprising a pinion, a forwardly extending pin carried thereby adjacent its periphery, a stationary pin centrally positioned with respect to said pinion, and means for oscillating said pinion.

21. In a support-wire forming machine having a rotatable work support and a shelf carrying the forming mechanism, an attachment adapted to be secured to said shelf upon removal of said forming mechanism, said attachment comprising a casting, a pair of parallel shafts rotatably supported therein, a pair of jaws secured to said shaft, and means carried by one of said jaws for engaging the wire to form a pigtail hook therein, said last-mentioned means comprising a pinion provided with two forwardly extending pins, one of which is positioned adjacent its periphery and the other from its center, a rack in engagement with said pinion, and means extending through one of said shafts and connected to said rack for oscillating said pinion.

22. In a support-wire forming machine having a rotatable work support and a shelf carrying the forming mechanism, an attachment adapted to be secured to said shelf upon removal of said forming mechanism, said attachment comprising a casting, a pair of parallel shafts rotatably supported therein, a pair of jaws secured to said shafts, and means carried by one of said jaws for engaging the wire to form a pigtail hook therein, said last-mentioned means comprising a pinion provided with two forwardly extending pins, means for oscillating said pinion, and guiding means for engaging the wire adjacent its end to direct the wire next to the shank thereof during oscillation of said pinion.

23. In a support-wire forming machine having a rotatable work support and a shelf carrying the forming mechanism, an attachment adapted to be secured to said shelf upon removal of said forming mechanism, said attachment comprising a casting, a pair of parallel shafts rotatably supported therein, a pair of jaws secured to said shafts, and means carried by one of said jaws for engaging the wire to form a pigtail hook therein, said last-mentioned means comprising a pinion provided with two forwardly extending pins, means for oscillating said pinion, and guiding means for engaging the wire adjacent its end to direct it next to the shank thereof during oscillation of said pinion, said last-named means being adjustable to vary the opening in the pigtail hook.

24. In a wire-forming device comprising a pair of cutting jaws, cutters carried thereby, means for actuating said jaws toward and from each other, a pivoted plate mounted on one of said jaws, a pinion rotatably mounted on the lower end of said plate, a pair of forwardly extending pins one of which is secured to said pinion in such manner as to move about the other pin, a downwardly projecting arm secured to said jaw, a cam on the other jaw adapted to engage said arm to rock said pivoted plate upon movement of said jaws toward each other, a guide juxtapositioned to said pins so as to engage the end of said wire, a rack slidably mounted in said pivoted plate and in engagement with said pinion, means for reciprocating said rack at substantially the termination of the movement of said jaws toward each other so that a wire positioned therebetween will be severed by said cutters and engaged by said pins to form the same into a hook.

25. In a machine of the character described, a pair of cutting jaws, means for relatively moving said jaws to engage and sever a wire positioned therebetween, and wire-bending mechanism movable to and from operative relation with said wire upon a movement of said jaws, and means for automatically actuating said wire bending mechanism to form an end of the wire into a hook after the severing operation.

26. In a machine of the character described, a pair of cutting jaws, means for rocking said jaws toward and from each other to sever a wire, and means movable with one of said jaws for engaging the wire after severance to automatically form the same into a hook.

27. In a machine of the character described, a pair of movable members, cutting jaws mounted upon said members, means for moving said members to cause said jaws to engage and sever a wire placed therebetween, and means carried by one of said members for automatically forming the wire into a hook after severance.

28. In a wire-forming mechine, the combination with a rotatable shaft and a series of cams actuated thereby of an attachment adapted to be juxtaposed with respect to said cams so as to be actuated thereby, said attachment comprising a casting, a plurality of shafts mounted for oscillation therein, a pair of cutting members connected to two of said shafts, and a wire-forming device connected to one of said cutting members, whereby upon movement of said cutting members in engagement with a wire for severance said forming device will be actuated therewith to form the wire after severance.

In testimony whereof, we have hereunto subscribed our names this 11th day of July, 1921.

JAMES BRYANT WHITMORE.
JOHN EBLING FERGUSON.